United States Patent
Harmon et al.

(10) Patent No.: US 7,623,331 B2
(45) Date of Patent: Nov. 24, 2009

(54) METHOD AND SYSTEM FOR IMPROVING VOLTAGE REGULATOR ACCURACY IN VEHICLE ALTERNATORS

(75) Inventors: Jack D. Harmon, Carmel, IN (US); Mingshe Zhou, Norman, OK (US); Daniel Joseph Clark, Edmond, OK (US)

(73) Assignee: Remy International, Inc., Anderson, IN (US)

( * ) Notice: Subject to any disclaimer, the term of this patent is extended or adjusted under 35 U.S.C. 154(b) by 487 days.

(21) Appl. No.: 11/539,402

(22) Filed: Oct. 6, 2006

(65) Prior Publication Data

US 2008/0084639 A1    Apr. 10, 2008

(51) Int. Cl.
*H02H 3/24* (2006.01)
*H02H 7/06* (2006.01)
(52) U.S. Cl. .......................................... 361/90; 361/20
(58) Field of Classification Search .................... 361/20, 361/90
See application file for complete search history.

(56) References Cited

U.S. PATENT DOCUMENTS

| | | | |
|---|---|---|---|
| 3,984,755 A * | 10/1976 | Lehnhoff et al. ............... | 322/28 |
| 4,275,344 A * | 6/1981 | Mori et al. ..................... | 322/28 |
| 4,636,705 A * | 1/1987 | Bowman ....................... | 322/28 |
| 4,636,706 A * | 1/1987 | Bowman et al. .............. | 322/28 |
| 5,764,038 A * | 6/1998 | Bloeckl ........................ | 323/222 |
| RE37,609 E | 3/2002 | Bittner | |
| 6,359,421 B1 * | 3/2002 | Mueller et al. ................ | 322/20 |
| 6,462,517 B2 | 10/2002 | Asada | |
| 6,661,211 B1 * | 12/2003 | Currelly et al. ............. | 323/268 |
| 6,664,767 B2 | 12/2003 | Takahashi et al. | |
| 6,798,178 B1 * | 9/2004 | Bayadroun ................... | 323/274 |
| 6,803,748 B2 * | 10/2004 | Peter ............................ | 322/29 |
| 6,809,504 B2 * | 10/2004 | Tang et al. ................... | 323/274 |
| 2004/0108840 A1 | 6/2004 | Morrissette | |
| 2006/0043955 A1 | 3/2006 | Hung | |
| 2007/0210777 A1 * | 9/2007 | Cervera et al. .............. | 323/284 |

* cited by examiner

*Primary Examiner*—Ronald W Leja
(74) *Attorney, Agent, or Firm*—Cantor Colburn LLP

(57) ABSTRACT

A method for implementing voltage regulation for an electrical generator device includes comparing an output voltage of the electrical generator device to a desired set point voltage thereof, and generating an output control signal configured to regulate a field current of the generating device. The output control signal is generated in accordance with a linear mode of operation during one of an overvoltage condition and an undervoltage condition with respect to the desired set point voltage, and wherein the output control signal is automatically set to a predetermined value in a non-linear mode of operation during the other of the overvoltage condition and the undervoltage condition.

10 Claims, 3 Drawing Sheets

METHOD AND SYSTEM FOR IMPROVING VOLTAGE REGULATOR ACCURACY IN VEHICLE ALTERNATORS

BACKGROUND

The present invention relates generally to rotating electric machinery and, more particularly, to a method and system for improving voltage regulator accuracy in vehicle alternators.

Generators are found in virtually every motor vehicle manufactured today. These generators, also referred to as alternators, produce electricity necessary to power a vehicle's electrical accessories, as well as to charge a vehicle's battery. Generators must also provide the capability to produce electricity in sufficient quantities so to power a vehicle's electrical system in a manner that is compatible with the vehicle's electrical components. The alternator or generator typically uses a voltage regulator to regulate the charging voltage and output current in order to provide consistent operation during varying loads that would otherwise create voltage drops and other operational problems. Presently, conventional vehicle charging systems may utilize a voltage regulator having either a discrete transistor or, alternatively, a custom integrated circuit known as an Application Specific Integrated Circuit (ASIC).

Still other vehicle designs may also employ voltage regulators with advanced microprocessor functions that maintain a highly accurate regulated voltage produced by a generator. Microprocessor based regulators may also include advanced clock and memory circuits that store battery and power supply reference data, battery voltage and generator rotation speed, as well determine how much the battery is being charged and at what rate at any point in time.

As such advanced voltage regulator systems can be expensive, it would be desirable to be able to improve the accuracy and resolution of existing (and lesser expensive) microprocessor based regulator devices. For example, the resolution of one type of microprocessor based voltage regulator employing a 10-bit analog-to-digital converter is (for measuring a 20 volt range signal in a 12 volt alternator system) about 0.02 volts. That is, the microprocessor is only able to read an input voltage in 20 mV increments. On the other hand, the resolution of a pulse width modulation (PWM) driver used to control the duty cycle of the field current (between 0% and 100%) is about 500 steps (i.e., 0.2% increments). In terms of a set point system voltage (e.g., 14 volts), a conventional linear based regulation technique utilizes PWM steps when the system voltage is both above and below the set point. Thus, the actual accuracy of the regulated voltage does not match the resolution of the detectable voltage (i.e., +/−20 mV).

Accordingly, it would be desirable to be able to increase the accuracy of microprocessor based voltage regulators in a manner that avoids the addition of costly components that increase the resolution of the voltage detection capability (e.g., through a differential amplifier or microprocessor with 12-bit ADC capability.

SUMMARY

The foregoing discussed drawbacks and deficiencies of the prior art are overcome or alleviated by, in an exemplary embodiment, a method for implementing voltage regulation for an electrical generator device, including comparing an output voltage of the electrical generator device to a desired set point voltage thereof, and generating an output control signal configured to regulate a field current of the generating device, wherein the output control signal is generated in accordance with a linear mode of operation during of one of an overvoltage condition and an undervoltage condition with respect to the desired set point voltage, and wherein the output control signal is automatically set to a predetermined value in a non-linear mode of operation during the other of the overvoltage condition and the undervoltage condition.

In still another embodiment, a storage medium includes a computer readable computer program code for implementing voltage regulation for an electrical generator device, and instructions for causing a computer to implement a method. The method further includes comparing an output voltage of the electrical generator device to a desired set point voltage thereof, and generating an output control signal configured to regulate a field current of the generating device. The output control signal is generated in accordance with a linear mode of operation during of one of an overvoltage condition and an undervoltage condition with respect to the desired set point voltage, and the output control signal is automatically set to a predetermined value in a non-linear mode of operation during the other of the overvoltage condition and the undervoltage condition.

In still another embodiment, a voltage regulator for an electrical generator includes an electronic device configured to compare an output voltage of the generator to a desired set point voltage thereof, the electronic device further configured to generate an output control signal for regulating a field current of the generator. The output control signal is generated in accordance with a linear mode of operation during of one of an overvoltage condition and an undervoltage condition with respect to the desired set point voltage, and the output control signal is automatically set to a predetermined value in a non-linear mode of operation during the other of the overvoltage condition and the undervoltage condition.

In still another embodiment, a vehicle charging system includes an alternator having one or more stator windings on a stationary portion thereof and a field coil on a rotatable portion thereof. A voltage regulator is configured to regulate an output voltage of the alternator through control of a field current through the field coil. The voltage regulator further includes an electronic device configured to compare the output voltage of the alternator to a desired set point voltage thereof, and to generate an output control signal for regulating the field current of the generator. The output control signal is generated in accordance with a linear mode of operation during of one of an overvoltage condition and an undervoltage condition with respect to the desired set point voltage, and the output control signal is automatically set to a predetermined value in a non-linear mode of operation during the other of the overvoltage condition and the undervoltage condition.

BRIEF DESCRIPTION OF THE DRAWINGS

Referring to the exemplary drawings wherein like elements are numbered alike in the several Figures.

DETAILED DESCRIPTION

Disclosed herein is a method and system for improving voltage regulator accuracy in vehicle alternators. Briefly stated, a regulator (e.g., microprocessor based) is configured with the capability of switching between a linear mode of regulation (with respect to the field current) duty cycle and a fixed duty cycle, depending upon whether the sense voltage exceeds a set point of the system. In an exemplary embodiment, the regulator operates in the linear mode whenever the operating voltage is at or below the set point voltage, and is set to a minimum duty cycle whenever the operating voltage exceeds the set point. As a result, the linear mode of operation is essentially confined to half the range of system voltages, and allows for finer control below the set point. Further, by using linear control during an undervoltage condition and a minimum established duty cycle during an overvoltage condition, the system voltage is protected from overshoot, which is another desirable operating condition.

Figure 1:
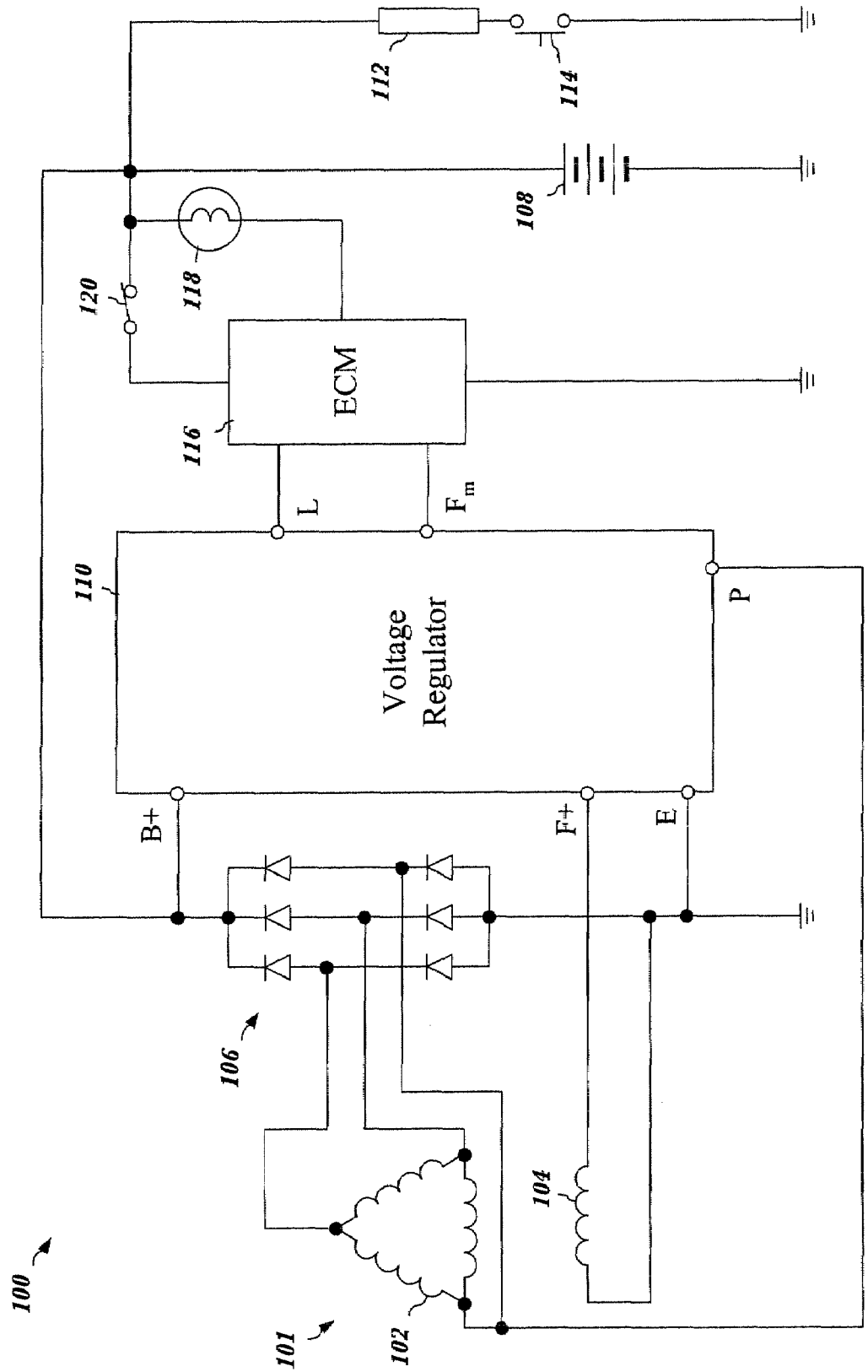
FIG. 1 is a schematic diagram of an exemplary vehicle charging system employing a microprocessor based voltage regulator, suitable for use in accordance with an embodiment of the invention.

Referring initially to FIG. 1, there is shown a schematic diagram of an exemplary vehicle charging system 100 employing a microprocessor based voltage regulator, suitable for use in accordance with an embodiment of the invention. It should be appreciated that although FIG. 1 depicts a vehicle charging system, the present embodiments are applicable to other types of regulated generator systems. A vehicle alternator 101 has a plurality of windings 102 (e.g., three-phase, delta configuration) in a stator portion thereof, and a field coil 104 in a rotor portion thereof. The alternating current (AC) voltage generated in the windings 102 is converted to a direct current (DC) voltage by a full-wave rectifier 106, which in turn includes three diode-pairs configured in parallel. The DC output of the rectifier 106 is fed to the positive terminal of a vehicle battery 108, wherein the magnitude of the output voltage is dependent upon the speed of the rotor and the amount of field current supplied to the field coil 104.

In certain alternator designs, the stator may actually include independent pairs of stator windings and an associated pair of rotor field coils to reduce noise in view of increased load escalation. However, for purposes of simplicity, only one set of stator windings and field coil is illustrated. It will also be appreciated that the windings 102 could alternatively be connected in a Y-configuration having a common neutral point.

As further illustrated in FIG. 1, a voltage regulator 110 is utilized to regulate and control the magnitude of the output voltage generated by the alternator 101, and thus control the (direct current) charging voltage applied to the battery 108 and associated vehicle loads (e.g., load 112 connected through switch 114). It does so by controlling the magnitude of field current supplied to field coil 104 through high-side alternator terminal "F+" shown in FIG. 1. Additional details concerning the generation of current through the field coil 104 by regulator 110 are discussed in further detail hereinafter.

One skilled in the art may also recognize other standardized terminals associated with the alternator, including: the high-side battery output terminal "B+", the phase voltage terminal "P" used to monitor the AC output voltage of the alternator; and the ground terminal "E" used to provide a ground connection for the alternator. An electronic control module 116 (ECM), which may represent the vehicle's main computer, receives a charge warning lamp signal through lamp terminal "L" of the regulator 110, used to control a charge warning lamp 118 when ignition switch 120 is closed. The ECM 116 also receives a rotor switching signal through terminal "$F_m$", indicative of the field current signal F+applied to the field coil 104.

Figure 2:
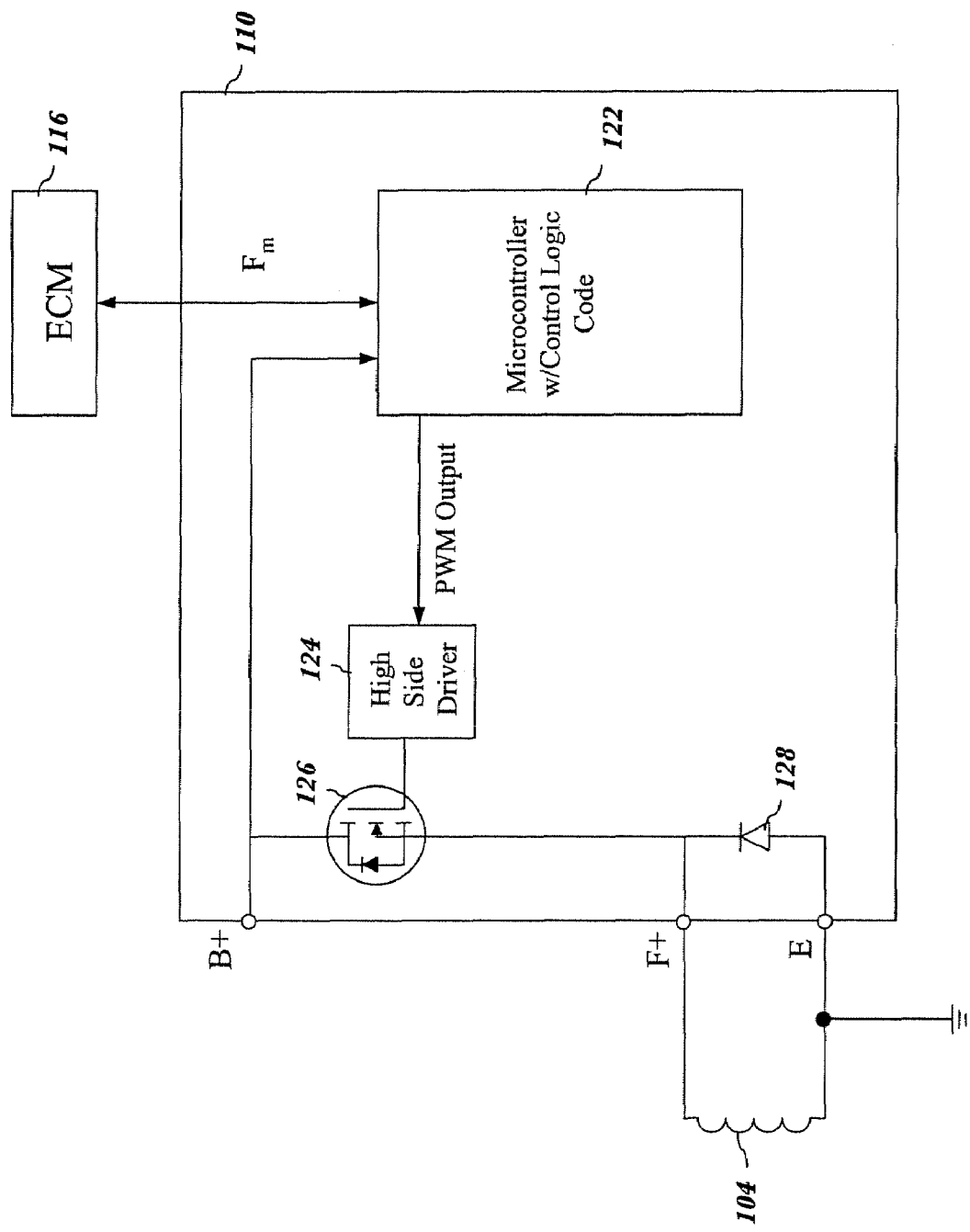
FIG. 2 is a more detailed schematic diagram of the voltage regulator shown in FIG. 1.

Referring now to FIG. 2, a more detailed schematic diagram of at least portions of the voltage regulator 110 of FIG. 1 is illustrated. For purposes of simplification, various discrete electronic components (e.g., resistors, capacitors, etc.) of the regulator 110 are not depicted in FIG. 2. A microcontroller 122 having control logic code therein receives feedback of the alternator charging system voltage(s) in digital form through an internal analog-to-digital converter (ADC) configured therein. In an exemplary embodiment, the ADC of microcontroller 122 is a 10-bit converter. Based on a comparison between the sensed system voltage and a predetermined set operating voltage of the system, the microcontroller generates a PWM output signal (PWM_DC) that is coupled to a high-side driver 124. The high-side driver 124 in turn provides a pulsed switching signal to the control terminal (e.g., gate) of transistor 126. Based on the duty cycle of the pulsed signal, the on/off switching of transistor causes field current to intermittently flow through field coil 104. During "off" periods of the duty cycle, energy within the field coil is dissipated through a flyback diode 128.

As indicated above, the regulator 110 attempts to maintain a predetermined charging system voltage level (set point). When the charging system voltage falls below this point, the regulator 110 increases the level of field current by increasing the duty cycle of the PWM_DC current. Conversely, when the charging system voltage increases above the system set point, the 110 decreases the level of field current by decreasing the duty cycle of the PWM_DC current.

Figure 3:
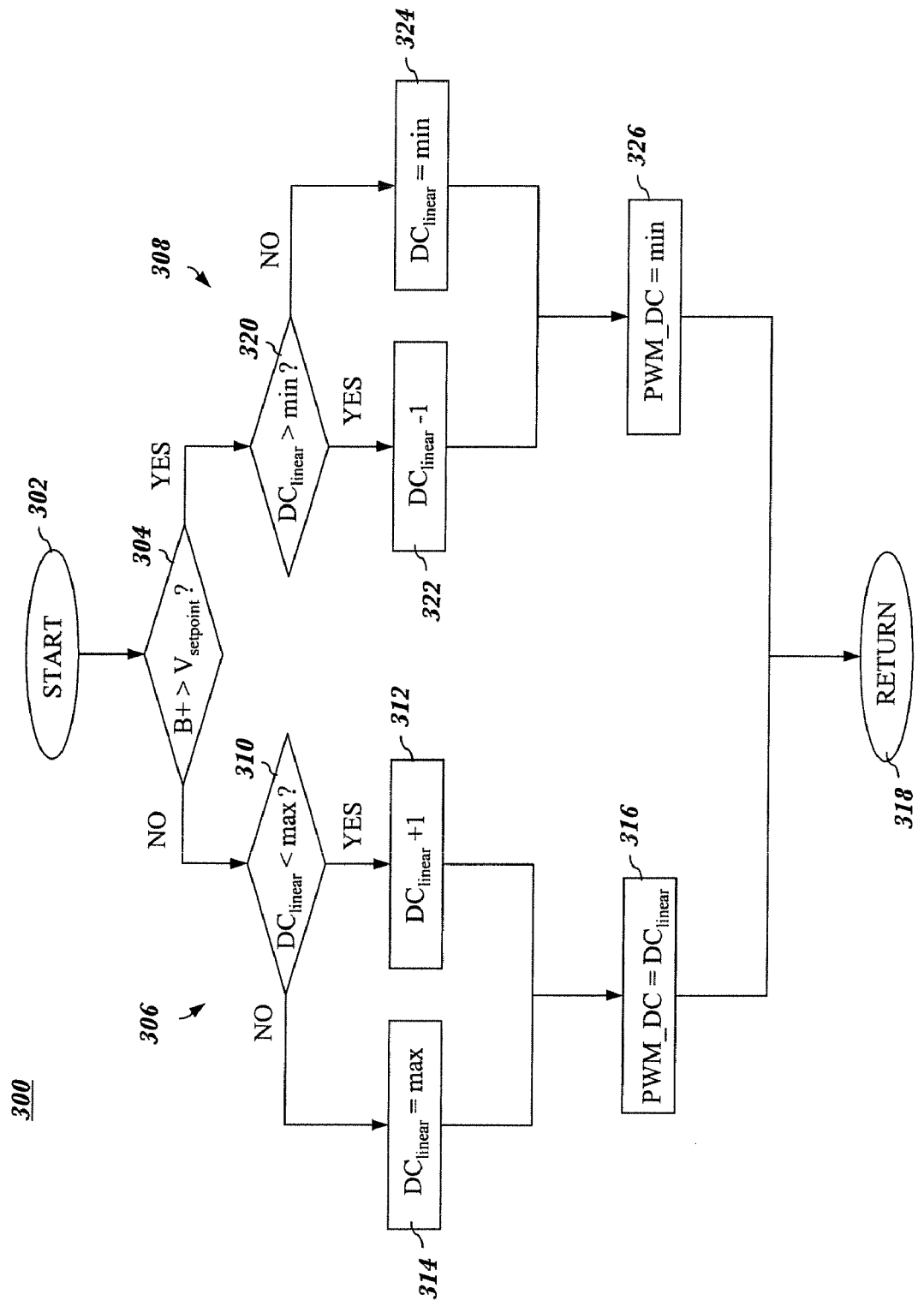
FIG. 3 is a flow diagram illustrating a method for improving voltage regulator accuracy, in accordance with an exemplary embodiment of the invention.

As further indicated above, a conventionally configured microcontroller (e.g., having 10-bit ADC resolution) may operate in a linear manner, regardless of whether the operating voltage is less than or exceeds the set point voltage. Accordingly, FIG. 3 illustrates a flow diagram illustrating a method 300 for implementing voltage regulation for an electrical generator device in accordance with an embodiment of the invention. Beginning from start block 302, the method 300 proceeds to decision block 304 where it is determined whether the system voltage exceeds the set point (i.e., the desired operating voltage of the system). If the system voltage is at or below the set point, then the regulated output of the system is executed in a linear fashion, as generally shown at subroutine 306. However, if the system voltage exceeds the set point, then the regulated output of the system is executed in a non-linear fashion, as generally shown at subroutine 308.

In the linear mode subroutine 306, it is determined at decision block 310 whether the value of an internally computed duty cycle step variable ($DC_{linear}$) is less than a maximum value. In the embodiment depicted, this parameter represents a particular PWM step. For example, for a 500-step PWM granularity between a 0% duty cycle and a 100% duty cycle, the maximum value of $DC_{linear}$ may be established to be 500 (i.e., representing a commanded 100% duty cycle). So long as $DC_{linear}$ is not at its maximum value, then the value is incremented by 1, as shown in block 312. On the other hand, if the value of $DC_{linear}$ is already at the maximum value (e.g., 500) as reflected at block 314, the parameter is not incremented. Moreover, in accordance with a linear regulation technique, an updated value of the output PWM duty cycle signal (PWM_DC) applied to the high-side driver 124 is set to the current value of $DC_{linear}$. In block 318, the method returns to the beginning for the next determination of the value of the system voltage.

Referring once again to decision block 304, if the system voltage exceeds the set point, then the method proceed to subroutine 308. At decision block 320, it is determined whether the internally computed value ($DC_{linear}$) is greater than a minimum established value. In the example of a 500-step PWM granularity between a 0% duty cycle and a 100% duty cycle, the minimum value of $DC_{linear}$ may be established to be 0 (i.e., representing a commanded 0% duty cycle). As a practical matter, it may be more desirable to have the minimum value of $DC_{linear}$ established at a value corresponding to some level representative of a low (but greater than 0%) cycle, such as 45, for instance. In other words, a minimum commanded duty cycle could be on the order of about 10% or less.

If the value $DC_{linear}$ is not at its minimum value, then its value is decremented by 1, as shown in block 322. On the other hand, if the value of $DC_{linear}$ is already at the minimum established value (e.g., 45) as reflected at block 324, the parameter is not decremented. However, unlike the linear mode subroutine 306, the value of the output PWM duty cycle signal (PWM_DC) applied to the high-side driver 124 is automatically set to the established minimum value of $DC_{linear}$, (e.g., 45) regardless of what the actual value of $DC_{linear}$ is at that moment in time. In other words, if the current value of $DC_{linear}$ is somewhere around the midpoint of the possible range of values (e.g., 250), then PWM_DC is still set in a non-linear fashion to the minimum possible value of $DC_{linear}$, instead of the actual value of $DC_{linear}$, as shown in block 326.

From the perspective of the system operating voltage, as soon as an overvoltage condition is detected, the regulator's response is to immediately minimize the PWM duty cycle so as to minimize the field current to rapidly lower the output voltage. Conversely, an undervoltage condition is addressed in a linear fashion to incrementally increase the field current so as to smoothly increase the output voltage. In so doing, the alternator system is protected from overshoot while also increasing the accuracy of the regulator.

Although the exemplary method outlined above is depicted as being implemented in software within the microcontroller 112, one skilled in the art will also appreciate that the logic can also be implemented through hardware configured within an ASIC type regulator, for instance. In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for implementing voltage regulation for an electrical generator device, the method comprising:
   comparing an output voltage of the electrical generator device to a desired set point voltage thereof;
   generating an output control signal configured to regulate a field current of the generating device, the output control signal comprising a pulse with modulation signal configured to control the duty cycle of a switching device selectively activating and deactivating the field current;
   wherein the output control signal is generated in accordance with a linear mode of operation during an undervoltage condition with respect to the desired set point voltage, and wherein the output control signal is automatically set to a predetermined value in a non-linear mode of operation during an overvoltage condition;
   linearly incrementing the value of a duty cycle step variable during the undervoltage condition, so long as the value of the duty cycle step variable is not already at a predetermined maximum value thereof;
   linearly decrementing the value of a duty cycle step variable during the overvoltage condition, so long as the value of the duty cycle step variable is not already at a predetermined minimum value thereof;
   setting the output control signal to correspond to the present value of the duty cycle step variable during the linear mode of operation; and
   setting the output control signal to correspond to the predetermined minimum value of the duty cycle step variable during the non-linear mode of operation, regardless of the present value of the duty cycle step variable.

2. The method of claim 1, further comprising setting the duty cycle of the switching device to a predetermined minimum value during the overvoltage condition.

3. A storage medium, comprising:
   a computer readable computer program code for implementing voltage regulation for an electrical generator device; and
   instructions for causing a computer to implement a method, the method further comprising:
   comparing an output voltage of the electrical generator device to a desired set point voltage thereof;
   generating an output control signal configured to regulate a field current of the generating device, the output control signal comprising a pulse with modulation signal configured to control the duty cycle of a switching device selectively activating and deactivating the field current;
   wherein the output control signal is generated in accordance with a linear mode of operation during an undervoltage condition with respect to the desired set point voltage, and wherein the output control signal is automatically set to a predetermined value in a non-linear mode of operation during an overvoltage condition;
   linearly incrementing the value of a duty cycle step variable during the undervoltage condition, so long as the value of the duty cycle step variable is not already at a predetermined maximum value thereof;
   linearly decrementing the value of a duty cycle step variable during the overvoltage condition, so long as the value of the duty cycle step variable is not already at a predetermined minimum value thereof;
   setting the output control signal to correspond to the present value of the duty cycle step variable during the linear mode of operation; and setting the output control signal to correspond to the predetermined minimum value of the duty cycle step variable during the non-linear mode of operation, regardless of the present value of the duty cycle step variable.

4. The storage medium of claim 1, wherein the method further comprises setting the duty cycle of the switching device to a predetermined minimum value during the overvoltage condition.

5. A voltage regulator for an electrical generator, comprising:
   an electronic device configured to compare an output voltage of the generator to a desired set point voltage thereof;
   the electronic device further configured to generate an output control signal for regulating a field current of the generator;
   a switching device in communication with the output control signal, the output control signal comprising a pulse with modulation signal configured to control the duty cycle of the switching device so as activate and deactivate the field current of the generator;
   wherein the output control signal is generated in accordance with a linear mode of operation during an undervoltage condition with respect to the desired set point voltage, and wherein the output control signal is automatically set to a predetermined value in a non-linear mode of operation during an overvoltage condition;
   wherein the electronic device is configured to:
   linearly increment the value of a duty cycle step variable during the undervoltage condition, so long as the value of the duty cycle step variable is not already at a predetermined maximum value thereof;
   linearly decrement the value of a duty cycle step variable during the overvoltage condition, so long as the value of the duty cycle step variable is not already at a predetermined minimum value thereof;
   set the output control signal to correspond to the present value of the duty cycle step variable during the linear mode of operation; and
   set the output control signal to correspond to the predetermined minimum value of the duty cycle step variable during the nonlinear mode of operation, regardless of the present value of the duty cycle step variable.

6. The voltage regulator of claim 5, wherein the electronic device further comprises a microcontroller.

7. The voltage regulator of claim 5, wherein the electronic device is configured to set the duty cycle of the switching device to a predetermined minimum value during the overvoltage condition.

8. A vehicle charging system, comprising:
   an alternator having one or more stator windings on a stationary portion thereof and a field coil on a rotatable portion thereof;
   a voltage regulator configured to regulate an output voltage of the alternator through control of a field current through the field coil, the voltage regulator further comprising:
   an electronic device configured to compare the output voltage of the alternator to a desired set point voltage thereof; and
   the electronic device further configured to generate an output control signal for regulating the field current of the generator;
   a switching device in communication with the output control signal, the output control signal comprising a pulse with modulation signal configured to control the duty cycle of the switching device so as activate and deactivate the field current of the generator;
   wherein the output control signal is generated in accordance with a linear mode of operation during an undervoltage condition with respect to the desired set point voltage, and wherein the output control signal is automatically set to a predetermined value in a non-linear mode of operation during an overvoltage condition;
   wherein the electronic device is configured to:
   linearly increment the value of a duty cycle step variable during the undervoltage condition, so long as the value of the duty cycle step variable is not already at a predetermined maximum value thereof:
   linearly decrement the value of a duty cycle step variable during the overvoltage condition, so long as the value of the duty cycle step variable is not already at a predetermined minimum value thereof;
   set the output control signal to correspond to the present value of the duty cycle step variable during the linear mode of operation; and
   set the output control signal to correspond to the predetermined minimum value of the duty cycle step variable during the non-linear mode of operation, regardless of the present value of the duty cycle step variable.

9. The vehicle charging system of claim 8, wherein the electronic device further comprises a microcontroller.

10. The vehicle charging system of claim 8, wherein the electronic device is configured to set the duty cycle of the switching device to a predetermined minimum value during the overvoltage condition.

* * * * *